(12) United States Patent
Crevier

(10) Patent No.: US 11,959,264 B2
(45) Date of Patent: Apr. 16, 2024

(54) SUCTION CUP ARTICLE FOR A URINAL SCREEN

(71) Applicant: Jeffrey Scott Crevier, Fort Lauderdale, FL (US)

(72) Inventor: Jeffrey Scott Crevier, Fort Lauderdale, FL (US)

(*) Notice: Subject to any disclaimer, the term of this patent is extended or adjusted under 35 U.S.C. 154(b) by 0 days.

(21) Appl. No.: 18/198,997

(22) Filed: May 18, 2023

(65) Prior Publication Data

US 2023/0374766 A1 Nov. 23, 2023

Related U.S. Application Data

(60) Provisional application No. 63/343,452, filed on May 18, 2022.

(51) Int. Cl.
*E03D 13/00* (2006.01)
*A47G 1/17* (2006.01)
*F16B 47/00* (2006.01)

(52) U.S. Cl.
CPC ............. *E03D 13/005* (2013.01); *A47G 1/17* (2013.01); *F16B 47/00* (2013.01)

(58) Field of Classification Search
CPC .......... F16B 47/00; A47G 1/17; E03D 13/005
USPC ... 248/206.3, 206.4, 683, 363, 205.5, 205.6, 248/205.7, 205.8, 206.2
See application file for complete search history.

(56) References Cited

U.S. PATENT DOCUMENTS

| | | | | |
|---|---|---|---|---|
| 1,829,924 A | * | 11/1931 | Evertts | B60J 3/02 248/205.5 |
| 1,920,185 A | * | 8/1933 | Carr, Jr. | B60J 3/02 160/370.21 |
| 2,111,456 A | * | 3/1938 | Markle, Jr. | A47J 43/18 269/53 |
| 2,221,238 A | * | 11/1940 | Johnson | F16B 47/00 248/205.5 |
| 2,568,714 A | * | 9/1951 | Britton | A47K 5/05 248/309.2 |
| 2,663,530 A | * | 12/1953 | Nye | A47K 10/12 248/205.5 |

(Continued)

FOREIGN PATENT DOCUMENTS

CN 2399120 Y * 10/2000
CN 2447309 Y * 9/2001

(Continued)

*Primary Examiner* — Kimberly T Wood
(74) *Attorney, Agent, or Firm* — The Concept Law Group, PA; Scott D. Smiley; Scott M. Garrett

(57) ABSTRACT

A suction cup article includes at least one suction cup unit having a suction cup, a neck, and a head. The head points in a direction away from the direction in which the suction cup is oriented to suction to a surface. The head has a point at a distal end of the head, and a base that is adjacent to, and wider than the neck. The head can be passed through an opening in a basin article such as a urinal screen, resulting in the neck being disposed in the opening, and the head, having a base that is wider than the opening, providing interference that holds the suction cup unit in the basin article. The suction cup unit can further include an arm that extends from the suction cup unit near the neck. The arm prevents the suction cup article from passing through the drain of the basin.

15 Claims, 11 Drawing Sheets

(56) References Cited

U.S. PATENT DOCUMENTS

| | | | | |
|---|---|---|---|---|
| 2,717,472 A | * | 9/1955 | Wilmington | A47K 5/05 248/309.2 |
| 2,938,297 A | * | 5/1960 | Greene | A47K 5/02 312/351 |
| 2,995,328 A | * | 8/1961 | Whitted | F16L 3/1236 411/970 |
| 3,046,588 A | * | 7/1962 | La Cluyse | A46B 17/00 15/167.1 |
| 3,137,086 A | * | 6/1964 | James | A47K 5/02 248/302 |
| 3,338,293 A | * | 8/1967 | Hohmann | B60J 11/08 248/205.5 |
| 4,991,807 A | * | 2/1991 | Radnich | A47K 5/02 269/95 |
| 5,110,078 A | * | 5/1992 | Gary | F21V 19/0005 248/316.1 |
| 5,247,391 A | * | 9/1993 | Gormley | B60J 3/02 296/97.7 |
| 5,386,960 A | * | 2/1995 | O'Brien | G09F 21/04 248/205.5 |
| 5,911,395 A | * | 6/1999 | Hussaini | F16M 11/40 248/316.4 |
| 6,244,778 B1 | * | 6/2001 | Chesbrough | A47G 1/17 403/57 |
| D485,197 S | * | 1/2004 | Rodriguez | D10/80 |
| 2005/0211729 A1 | * | 9/2005 | Bassett | A47K 5/12 222/321.7 |
| 2007/0221801 A1 | * | 9/2007 | Jensen | F16B 45/00 248/206.2 |

FOREIGN PATENT DOCUMENTS

| | | | | |
|---|---|---|---|---|
| CN | 2814719 Y | * | 9/2006 | |
| DE | 19748788 A1 | * | 5/1999 | B65D 57/00 |
| KR | 102255856 B1 | * | 5/2021 | |
| KR | 102255856 B1 | * | 5/2021 | |

* cited by examiner

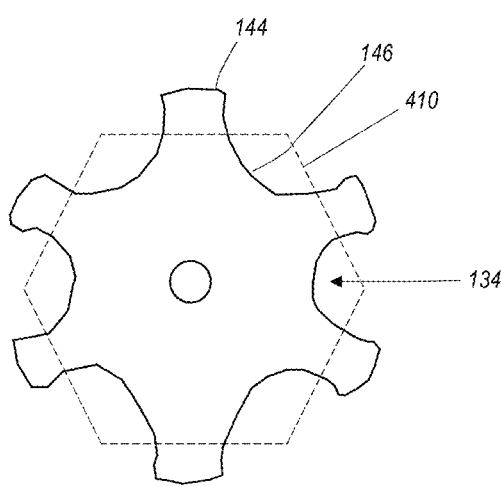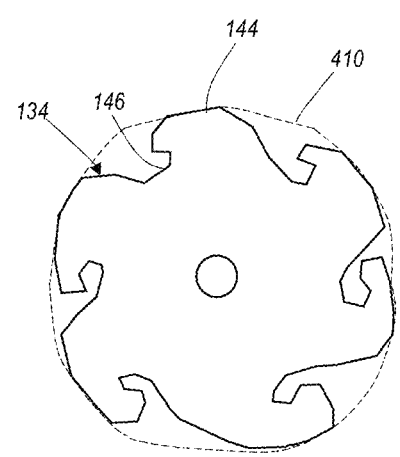
FIG. 7A
FIG. 7B

SUCTION CUP ARTICLE FOR A URINAL SCREEN

CROSS REFERENCE

This application claims priority to U.S. provisional application No. 63/343,452, filed May 18, 2022, the entirety of which is hereby incorporated by reference.

FIELD OF THE DISCLOSURE

The present invention relates generally to mounting devices, such as for urinal screens and other articles, and more particularly, it relates to a suction cup article that is useful for mounting a urinal screen on the surface of the urinal where the suction cup article is configured to prevent the suction cup article from going down the drain in the event that it becomes detached from the urinal screen and the urinal surface by linking at least two suction cups together in a suitably rigid structure where the suction cups are spaced apart from each other such that overall size of the suction cup article prevents it from passing into the urinal drain plumbing and creating an obstruction.

BACKGROUND OF THE INVENTION

Urinal screens are used in urinals to reduce or prevent unwanted splash, where fluids can leave the urinal and end up on the floor under and around the urinal, or even on the user of the urinal. A typical urinal screen is designed with a top covered with anti-splash features such as meshes, protrusions, fibers, and other such features that tend to allow fluids to pass through but block or reduce splash by breaking up fluid steams and drops and blocking splash. While the basic operation of urinal screens are well known, a number of problems arise with their use. For one, there are a wide variety of urinal designs in use. The designs vary in shape as well as operation. Some have flushless designs, and some use a flush operation. This makes it difficult to design one urinal screen that will be effective across a wide variety of urinal designs. One of the problems encountered is that urinal screens can be moved by the flow of water in the basin, such as during a flush, thereby exposing surface area in the basin that can produce splash upon a stream of fluid hitting the exposed surface.

To counter movement of urinal screens, some manufacturers have added suction cups to the back of the urinal screen to allow the urinal screen to be anchored in place. Suction cups have also been used to arrange urinal screens on the vertical surface at the back of the urinal for added splash reduction. While these work for the most part, as the urinal screen ages, and if it is not changed out at the recommended life cycle interval, it is not uncommon for the suction cup to dislodge from the urinal screen due to fluid forces acting against the suction cup(s). When this occurs the suction cup can end up in the drain and create a blockage.

Therefore, a need exists to overcome the problems with the prior art as discussed above.

SUMMARY OF THE DISCLOSURE

In accordance with some embodiments of the inventive disclosure, there is provided a suction cup article for attaching a urinal screen to a urinal surface. The suction cup article can include at least one suction cup unit that includes a suction cup, a head, and a neck disposed between the head and the suction cup. The head is generally conic, having a point that is directed away from the suction cup. The head has a plurality of channels that extend from a base of the head, adjacent the neck, toward the point, thereby defining an equal number of fins between the channels. The suction cup article further includes at least one arm extending from the suction cup unit in a direction generally perpendicular to an axis defined from the point of the head through the neck and suction cup.

In accordance with a further feature, the suction cup article comprises three suction cup units, wherein a first suction cup unit is joined by a first arm to a second suction cup unit, and the third suction cup unit is joined to the second suction cup unit by a second arm, and wherein the three suction cup units are each identical and arranged in a "V" formation.

In accordance with a further feature, the entire suction cup unit is a unitary molded polymer.

In accordance with a further feature, the plurality of channels are positioned to each correspond with a position of a respective protrusion of the urinal screen disposed around an opening through the urinal screen.

In accordance with a further feature, the fins are configured to be deflected and return to their natural position.

In accordance with a further feature, the arm comprises a head subunit disposed at a distal end of the arm.

In accordance with some embodiments of the inventive disclosure, there is provided a suction cup article that includes a suction cup unit having a suction cup, a head, and a neck disposed between the head and the suction cup. The head is generally conic and has a point that is directed away from the suction cup. The head also has a plurality of channels that extend from a base of the head adjacent the neck toward the point thereby defining an equal number of fins between the channels. The fins are made of a resilient material such that the fins deflect into an adjacent channel when the head is inserted through an opening having a diameter smaller than the base of the head.

In accordance with a further feature, the suction cup is attached to a base, the base is attached to the neck, and an arm extends from the base.

In accordance with a further feature, there is further included a head subunit disposed at a distal end of the arm that includes a head having a conic shape and having a point, a neck at a base of the head, and a plurality of channels that extend from the base of the head adjacent the neck toward the point thereby defining an equal number of fins between the channels.

In accordance with a further feature, the suction up unit is a first suction cup unit, the suction cup article further comprising a second suction cup unit at an opposite end of the arm.

In accordance with a further feature, the arm is a first arm, the suction cup article further comprising a second arm extending from the second suction cup unit to a third suction cup unit.

In accordance with a further feature, the first, second, and third suction cup units are arranged in a "V" shape.

In accordance with some embodiments of the inventive disclosure, there is provided a suction cup article that includes a suction up unit having a base, a suction cup extending from the base, a neck extending from the base opposite from the suction cup, and a conic head extending from the neck opposite from the base. The conic head has a base adjacent the neck that extends outward beyond the neck, and the conic head has a point opposite from the base.

In accordance with a further feature, the conic head further comprises a plurality of channels the extend from the base toward the point.

In accordance with a further feature, the plurality of channels define a plurality of fins, each fin of the plurality of fins between two channels of the plurality of channels, and wherein each of the fins of the plurality of fins are configured to deflect to a side when the head is passed through an opening.

In accordance with a further feature, there is further included an arm extending from the base.

In accordance with a further feature, there is further included a head subunit disposed at a distal end of the arm.

In accordance with a further feature, the suction cup unit is a first suction cup unit, the suction cup article further comprises a second suction cup unit at an opposite end of the arm.

In accordance with a further feature, the arm is a first arm, the suction cup article further includes a second arm extending from the second suction cup unit.

Although the invention is illustrated and described herein as embodied in a suction cup article for a urinal screen, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. Where a tolerance range would be appropriate in a given dimension, it can be assumed that the range is +/−5%. Otherwise it is assumed that the dimensions are within a range suitable for the described purpose, which can be determined with ordinary and reasonable experimentation that is well within the skill of an ordinary artisan. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIGS. 7A-7B show a sequence of a head of a suction cup unit passing through an opening in a urinal screen where the fins of the head are deflected as they pass through the opening, in accordance with some embodiments;

DETAILED DESCRIPTION

Figure 1:
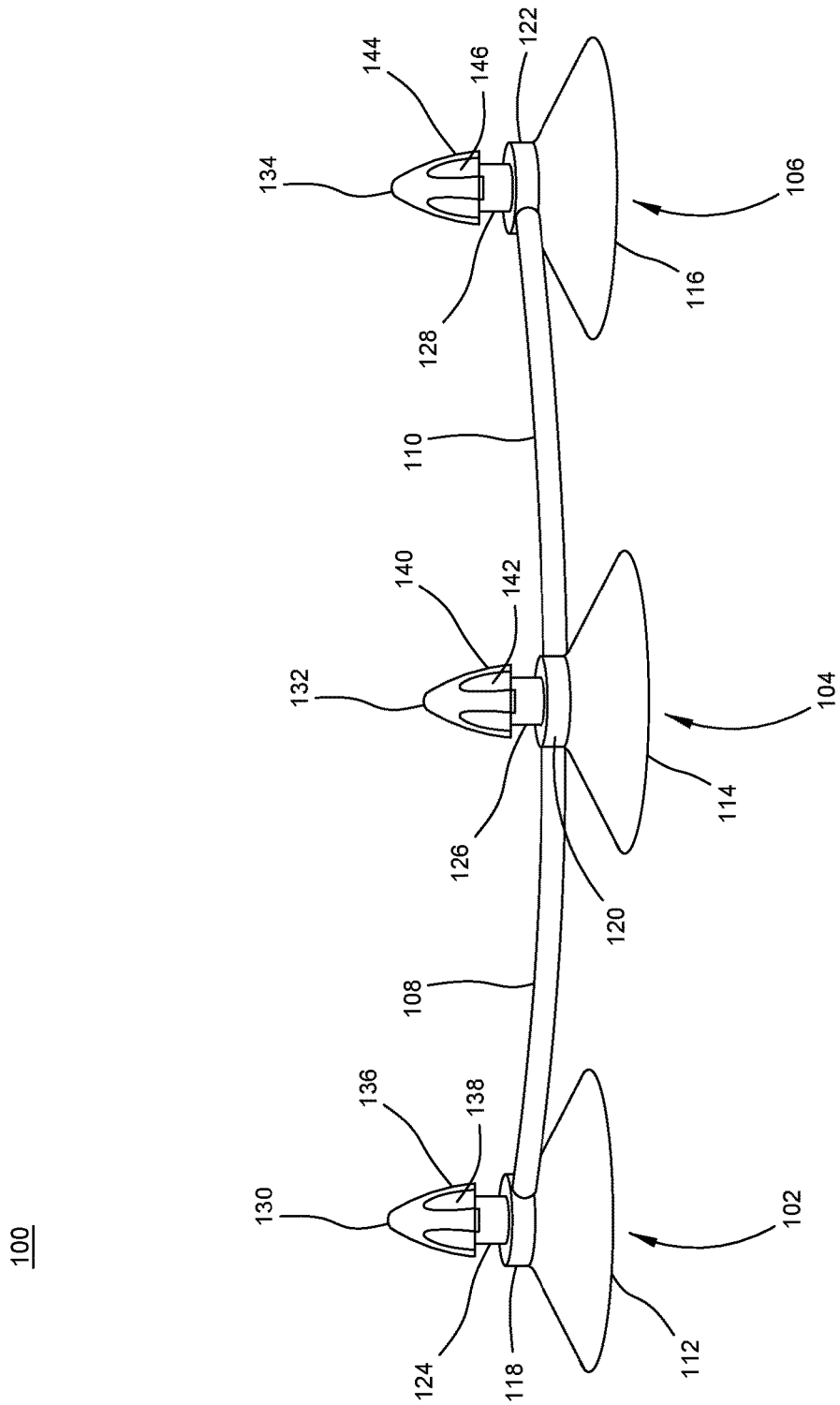
FIG. 1 is a side view of a suction cup article for a urinal screen, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2:
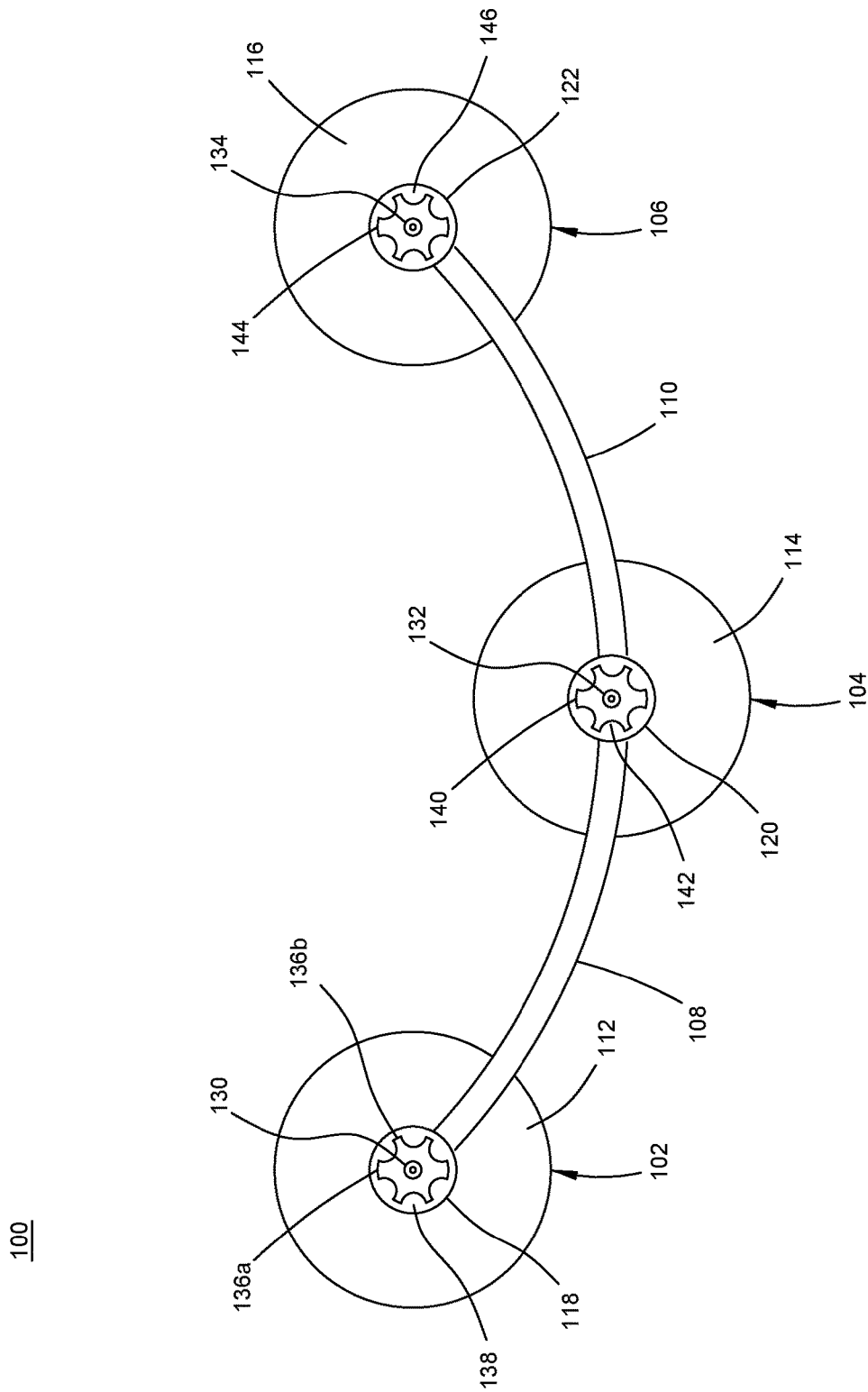
FIG. 2 is a top view of a suction cup article for a urinal screen, in accordance with some embodiments.

FIG. 1 is a side view of a suction cup article 100 for a urinal screen, and FIG. 2 is a top view of the suction cup article 100, in accordance with some embodiments. The suction cup article 100 shown here represents one example of a suction cup article, and numerous variations will occur to those skilled in the art which are equivalent. In general a suction cup article includes one or more suction cup units such as suction cup units 102, 104, 106, and at least one arm extending from the suction cup unit, such as arms 108, 110. In the present example, suction cup units 102 and 104 are commonly oriented, meaning the suction cups 112, 114 of each unit 102, 104 are facing in the same direction because they will be suctioned to a urinal basin surface, and they are connected by arm 108. Likewise suction cup units 104 and 106 are connected by arm 110.

In some embodiments a suction cup article can have a single suction cup unit with one arm extending from the suction cup unit where the arm is long enough to prevent the suction cup article from being flushed past a urinal drain and allow the suction cup article to be retrieved easily from the drain in the basin.

The present exemplary suction cup article 100 is particularly useful for holding the vertical portion of a urinal screen to the rear vertical surface of a urinal. Given the weight of the urinal screen and force of water that can be imparted to the urinal screen during flushing, the present suction cup article 100 include three suction cup units 102, 104, 106. The suction cup article 100 can be a molded article, where the entire article 100 is made of the same material. That material must allow flex of the suction cups 112, 114, 116, as well as provide sufficient stiffness in the arms 108, 110, and heads 130, 132, 134. An example of a suitable material would be ethylene-vinyl acetate (EVA).

Each suction cup unit 102, 104, 106 includes a suction cup 112, 114, 116 that extends from a base 118, 120, 122. The arms 108, 110 also connect to the bases 118, 120, 122, but can also connect to the upper portion(s) of the suction cups 112, 114, 116. Each suction cup unit 102, 104, 106 includes a head 130, 132, 134 that is generally conic and having a point directed in the opposite direction of the suction cups 112, 114, 116. Between each head 130, 132, 134 and the respective base 118, 120, 122 is a neck 124, 126, 128 that creates a narrowed region under each head 130, 132, 134. Further, each head 130, 132, 134 has a plurality of lengthwise channels 138, 142, 146 formed along a portion of the head, from the bottom of the head adjacent the neck 124, 126, 128 towards the point of the head opposite the neck 124, 126, 128. As a result, the heads 130, 132, 134 also have a plurality of fins 136, 140, 144 that extend between the channels 138, 142, 146. The channels 138, 142, 146 can have a semi-circular profile between the fins 136, 140, 144, and can be located to create different sized fins such as fins 136a and 136b. The head 130, 132, 134 of each suction cup unit 102, 104, 106 is configured to fit though an opening in a urinal screen, deflecting the material of the urinal screen around the opening outward as the head passes through, wherein it will contract around the neck 124, 126, 128. Thus, the bottom of the heads 130, 132, 134 nearest the neck 124, 126, 128 has a diameter that is greater than the dimensions of the holes/opening in the urinal screen so that the heads 130, 132m, 134 create an interference with the material of the urinal screen, thereby retaining the suction cup article 100 to the urinal screen.

Figure 3:
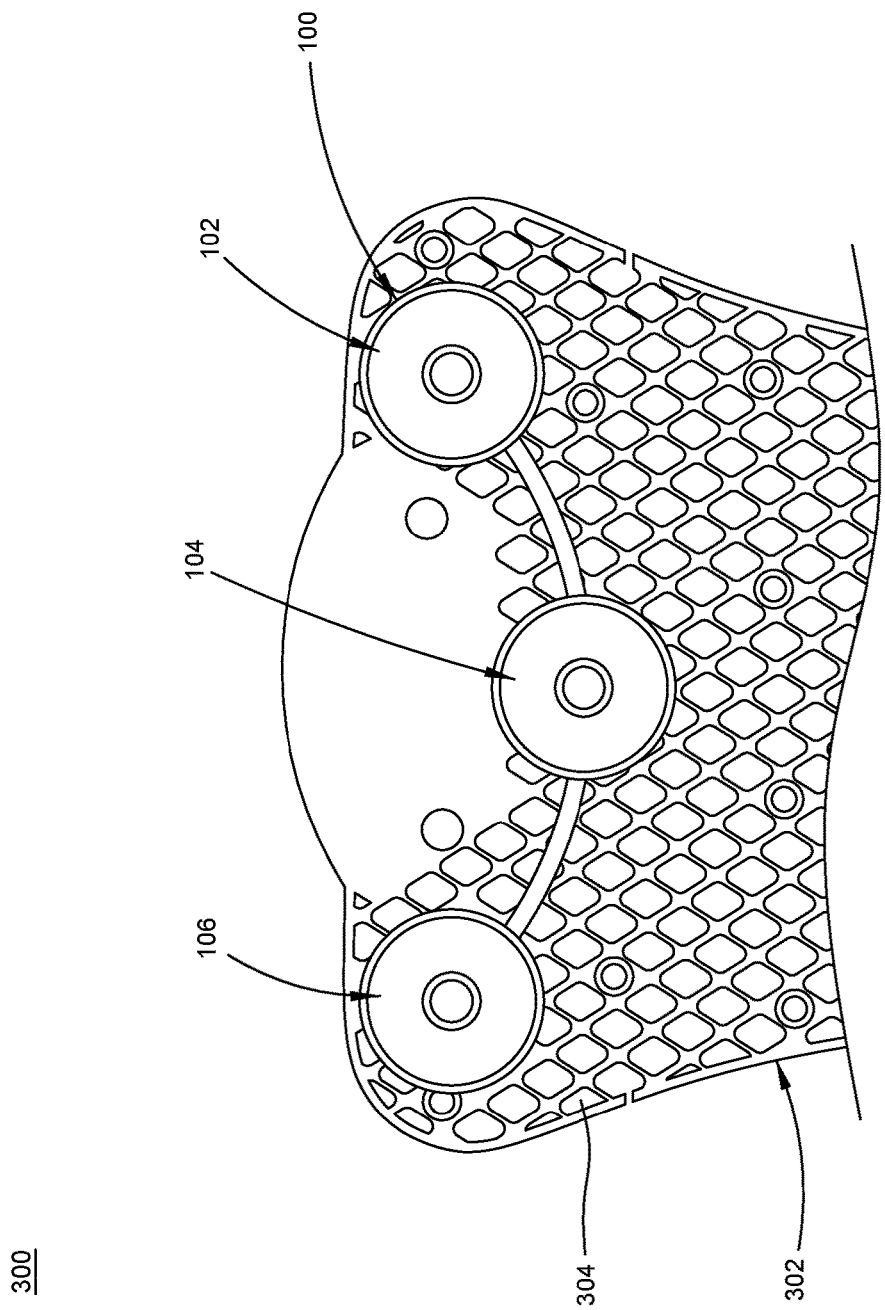
FIG. 3 is a rear view of a vertical portion of a urinal screen having a suction cup article attached, in accordance with some embodiments.

FIG. 3 is a rear view of a vertical portion of a urinal screen assembly 300, showing the back side of a urinal screen 302, having a suction cup article 100 attached, in accordance with some embodiments. The assembly 300 includes a urinal screen 302 that is made of a compliant material such as, for example, EVA (ethylene-vinyl acetate). The urinal screen includes a generally planar body that is mostly a mesh of holes 304 and links of material around the holes 304. The heads 130, 132, 134 of the suction cup units pass through these holes 304 so that the suction cup article is retained in place on the back of the urinal screen. Once installed as shown, the urinal screen assembly 300 can be placed in a urinal with the suction cups of each suction cup unit 102, 104, 106 being attached (suctioned) to the smooth vertical surface of the urinal by vacuum formed between the each suction cup and the urinal surface as a result of the suction cup being pressed toward the urinal surface to expel air from between the suction cup and the urinal surface, and then released, wherein the conic shape of the suction cup urges the center of the suction cup away from the urinal surface, thereby creating the vacuum such that atmospheric pressure holds the suction cup in place.

Over time, the urinal screen 302 and the suction cup article 100 will age, and the material they are made of can degrade, shrink, tear, etc. For that reason it is recommended that the urinal screen assembly be replaced by a certain time period to avoid those issues. However, if for some reason the urinal screen assembly is not replaced when recommended, and the suction cup article 100 becomes separated from the urinal screen 302 and falls into the bottom of the urinal where the drain is located, the shape and size of the suction cup article 100 will prevent the suction cup article from passing beyond the drain opening in the bottom of the urinal, with at least a portion of the suction cup article 100 will be within reach in the basin such that personnel can simply grasp and retrieve the suction cup article 100 from the basin. Given the size of the drain opening in many urinals, however, while a single suction cup could pass through the drain opening, the configuration of the suction cup article 100 prevents that from happening.

Figure 4:
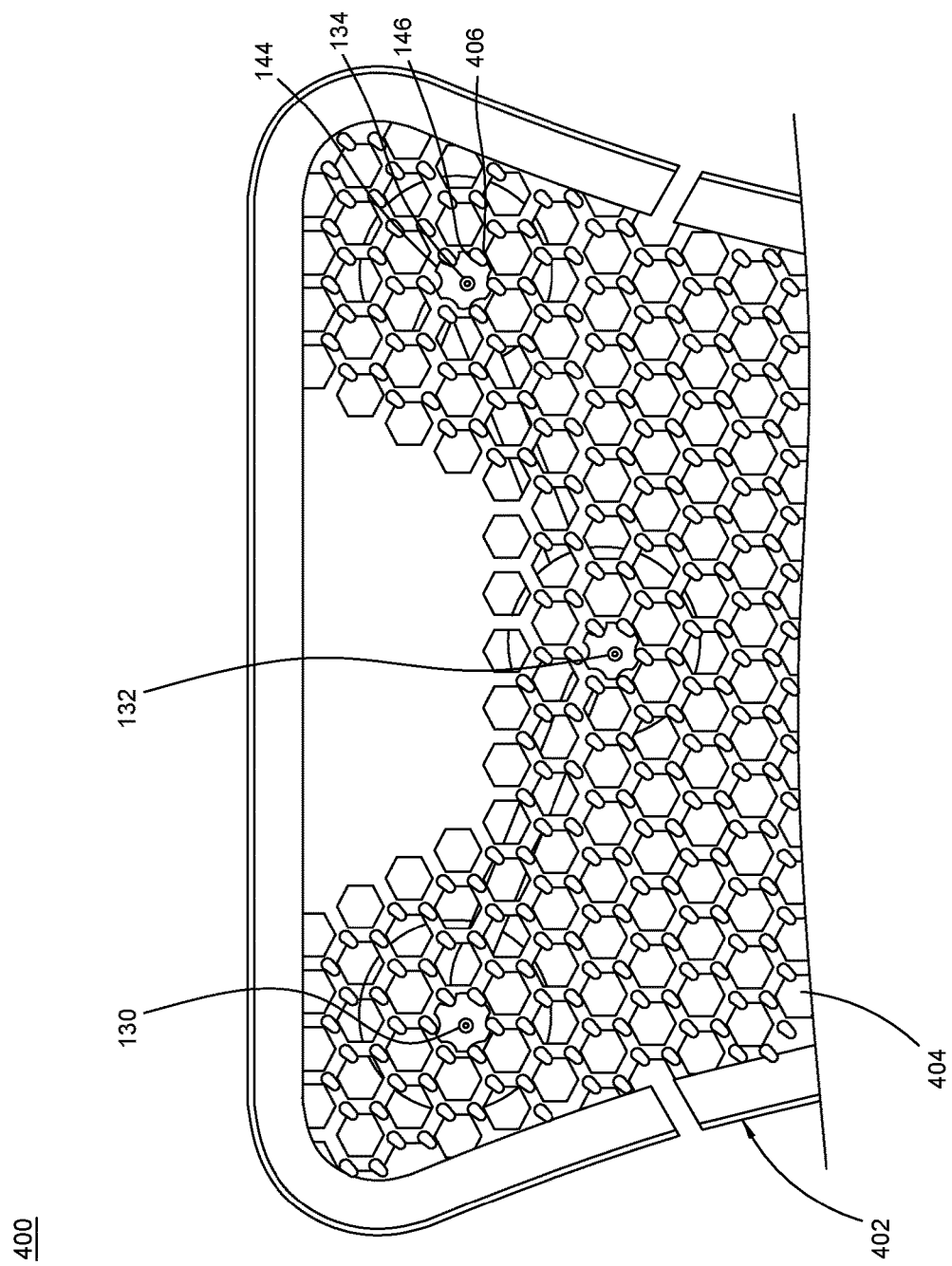
FIG. 4 is a front view of a vertical portion of a urinal screen having a suction cup article attached, in accordance with some embodiments.

FIG. 4 is a front view of a vertical portion of a urinal screen assembly 400 having a suction cup article attached, in accordance with some embodiments. This view shows the heads 130, 132, 134 protruding through openings 404 in the urinal screen 402. As with the urinal screen 302, the urinal screen 402 shown here includes a generally planar body having a mesh (e.g. a screen) of holes 404 that are each surrounded by links of material. On the front of the urinal screen 402 there are protrusions 406 that can extend from the links of material around the holes 404. In this example the holes 404 are hexagonal, and the heads 130, 132, 134 each have six channels and fins, where the channels, such as channels 146 on head 134, align with the protrusion 406 so as not to deflect the protrusions 406 outward, whereas the fins 144 extend between the adjacent protrusions 406. The fins 144 extend over the links of material and can bear against their respective link to retain the head, and thereby the suction cup article, in the urinal screen.

Furthermore, because the fins 144 are made of the same resilient material as the rest of the suction cup article, they can deflect to the side when passing through an opening in the urinal screen, or any other opening. It is contemplated that the suction cup article can be used in other applications beyond fixing urinal screens in position in a urinal. For example, a single suction cup having a head with fins and channels as shown, and without any arms that extend outward laterally, can be used to, for example, hang a picture on a smooth surface. The picture can be in a frame or on a sheet member that has an opening through it that is smaller in diameter than the base of the conic portion of the head, and upon insert the head through the opening, the fins will deflect to the side, into an adjacent channel, to fit through the opening, and once the base of the conic portion is passed the opening the fins will return to their original position and create an interference with the article through which the head was inserted, thereby retaining the article or picture with the suction cup. Thereafter the suction cup can be stuck on a smooth surface to fix the article or picture in place on the surface.

Figure 5:
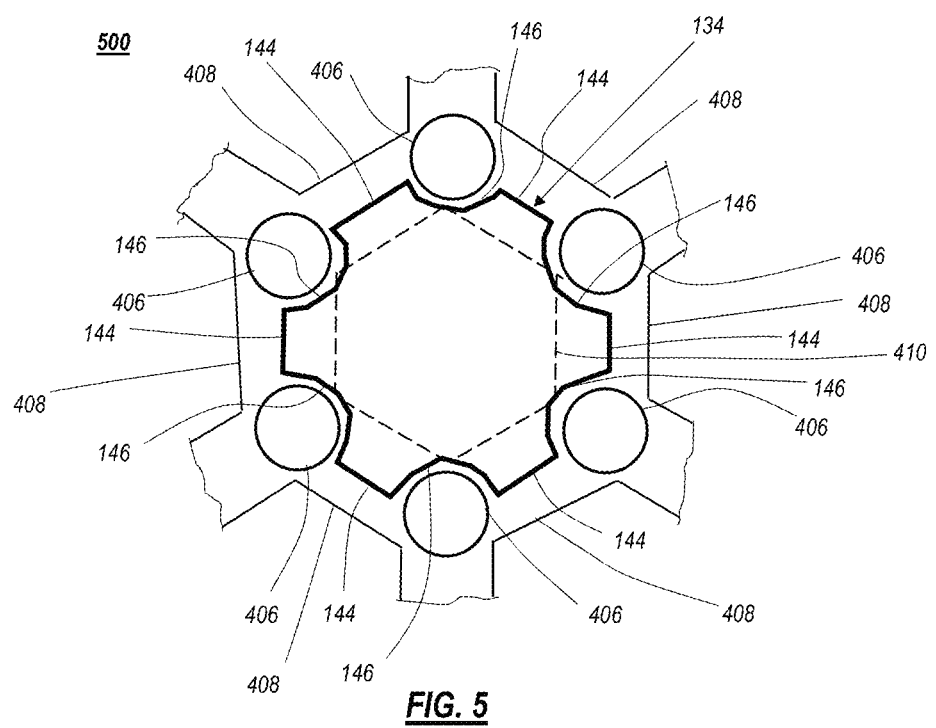
FIG. 5 is an overhead view of a head of a suction cup unit in place in a urinal screen, in accordance with some embodiments.
Figure 6:
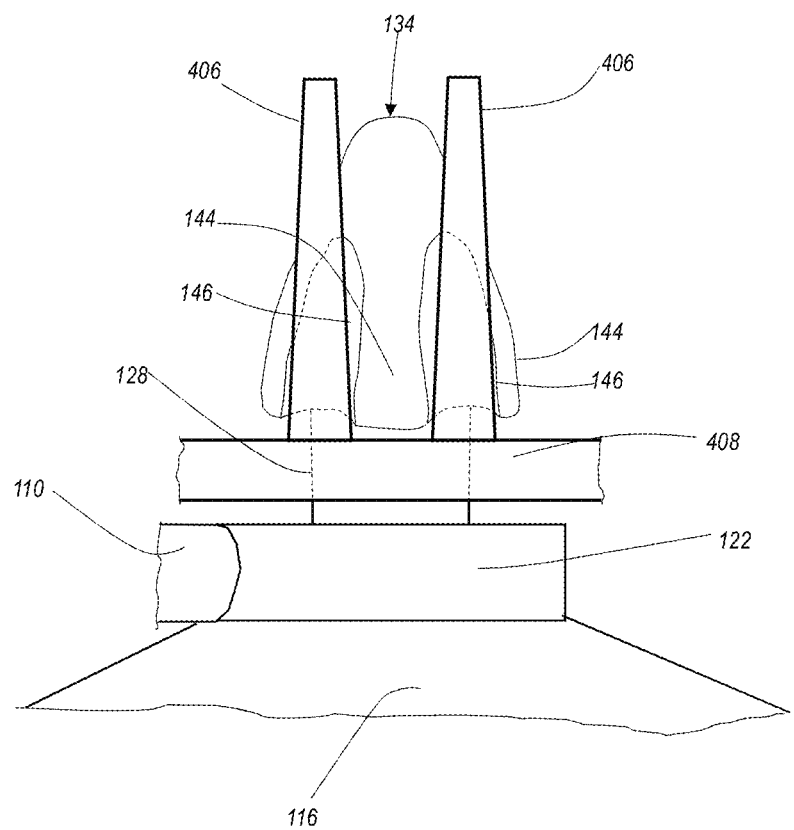
FIG. 6 shows a side view of the head of the suction cup unit as shown in FIG. 5.

FIG. 5 is an overhead view of a head 134 of a suction cup unit 106 in place in a urinal screen 402, in accordance with some embodiments, as shown in FIG. 4. The head 134 includes a plurality of fins 144 and channels 146. The channels 146 correspond to the location of protrusions 406 that extend from the urinal screen, and which are positioned at the intersection of links 408 around the openings 410. In this example, the openings 410 are hexagonal, so there are six vertices where the links 408 intersect, and where there is a respective protrusion 406 extending. Thus, the fins 144 extend outward from the head 134 between adjacent protrusions, and likewise, each protrusion 406 is partially in a respective channel 146 of the head 134. As can be seen, the fins 144 extend outward over the border of the opening 410, and thus create an interference with the links 408 which facilitates retention of the head 134 in the opening 410. FIG. 6 shows a side view of the head 134 of the suction cup unit 106 as shown in FIG. 5, retained in a urinal screen. In particular, the links 408 surround the neck 128 of the head 134, and the neck 128 passes through the opening 410 defined by the links 408 and connect to the base 122 which is at the top of the suction cup 116 and is connected to an arm 110. The protrusions 406 extend from the links 408 of the urinal screen, and are partially accommodated by the channels 146 between the fins 144 of the head 134. Thus, the head 134 does not deflect or bear against the protrusions 406, which would force them outwards at an angle which could alter their anti-splash function. It will be appreciated here that the protrusions 406 can extend substantially further above the top of the head 134 than appears here. The fins 144 extend outward from the conic body of the head 134 between the protrusions 406 and over the links 408 which creates the necessary interference to retain the head 134 in position, and therefore retain the suction cup article in the urinal screen.

FIGS. 7A-7B show a sequence of a head 134 of a suction cup unit 106 passing through an opening 410 in a urinal screen where the fins 144 of the head 134 are deflected as they pass through the opening 410, in accordance with some embodiments. In FIG. 7A, the opening 410 is shown as being hexagonal as it is bordered and defined by six of the links 408 than make up the body of the urinal screen. At the intersection of the links, where the vertices of the hexagonal opening 410 are location, there are protrusions 406 which correspond with the location of the channels 146 between the fins 144 of the head 134. Thus, as shown in FIG. 7A, the head 134 is shown as it would be either before or after passing through the opening 410. In FIG. 7B, the head 134 is in the process of passing through the opening 410. As can be seen, the fins 144 are deflected (e.g. bent over) by bearing against the sides of the opening 410. Further, the opening 410 is deformed as the material forming the sides that define the opening 410 are deflected outward by the force of the fins 144 bearing against them. Once the head 134 passes through the opening, and the bottoms of the fins 144 are past the side of the urinal screen and clear of the links, the fins 144 will return to their natural position of FIG. 7A, as will the sides/links defining the opening 410.

Figure 8:
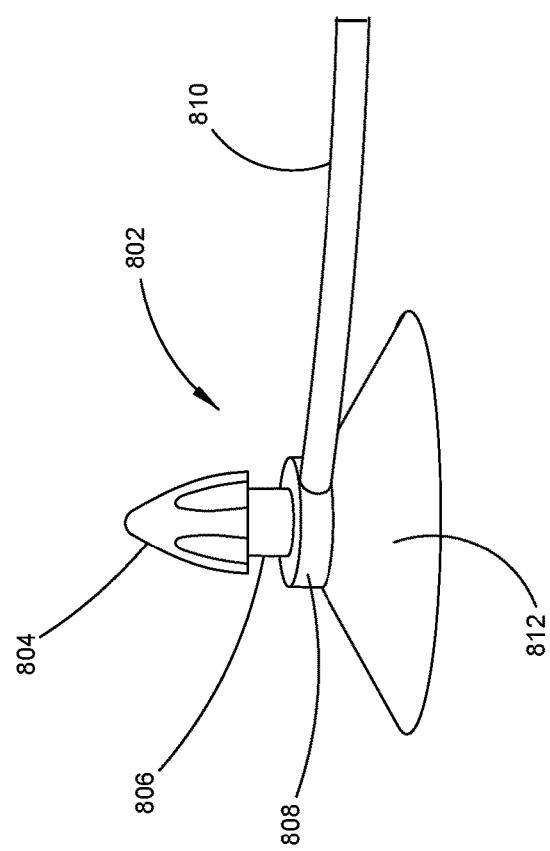
FIG. 8 shows an embodiment of a suction cup article having a single suction cup unit and one arm, in accordance with some embodiments.

FIG. 8 shows an embodiment of a suction cup article 800 having a single suction cup unit 802 and one arm 810, in accordance with some embodiments. The suction cup unit further includes a head 804 for retaining the suction cup article 800 to a urinal screen. The head 804 can have a conic shape, tapering to a point. The head 804 can sit on a neck 806 which is narrower/smaller in diameter than the bottom of the head 804. The neck is further connected to a base 808 that is attached to a suction cup 812. The arm 810 extends from a portion of the suction cup unit below the neck 806, meaning opposite the head 804. If the arm 810 extended from the head, it would not be possible, or at least not practical to pass the head through an opening in a urinal screen. Here, for example, the arm 810 extends from the base 808. The arm 810 extends some distance from the base 808, and the distance can be based, for example, on the dimensions of the urinal drain in which the suction cup article 800 is intended to be used, but in general, the longer the arm 810, the less likely it will be that the suction cup article can pass through the drain. Further, which the arm 810 shown here is a substantially straight member, it can be of any shape or pattern so long as it doesn't interfere with the function of the suction cup 812.

Figure 9:
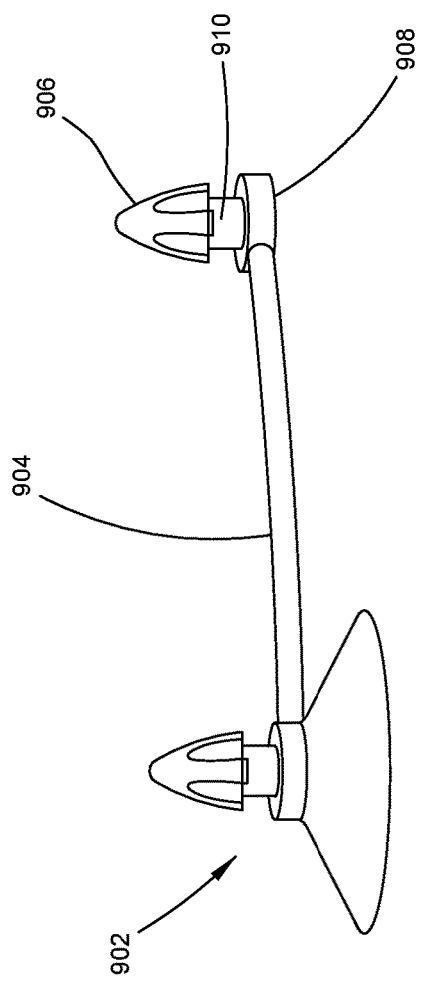
FIG. 9 shows an embodiment of a suction cup article having a single suction cup unit and one arm and an additional head at the distal end of the arm, in accordance with some embodiments.

FIG. 9 shows an embodiment of a suction cup article 900 having a single suction cup unit 902 and one arm 904 and an additional head 906 at the distal end of the arm 904, in accordance with some embodiments. This suction cup article 900 can be substantially similar to suction cup article 800 in FIG. 8 with the addition of the additional head 906. The additional head 906 can be substantially identical to the head of the suction cup unit 902, and includes a neck 910 that is connected to a base 908. The additional head 906 is also oriented the same as the head of the suction cup unit 902, and both heads are configured to pass through a urinal screen and be retained in the urinal screen by interference. The advantage of adding a second, additional head, is that is spreads the weight of the urinal screen over two points. For larger, vertically mounted urinal screens which can have a substantial vertical length, the weight of the entire urinal screen at a single point (i.e. if only one head is used) can deform the material of the urinal screen to the point that it could more easily dislodge from the head.

Figure 10:
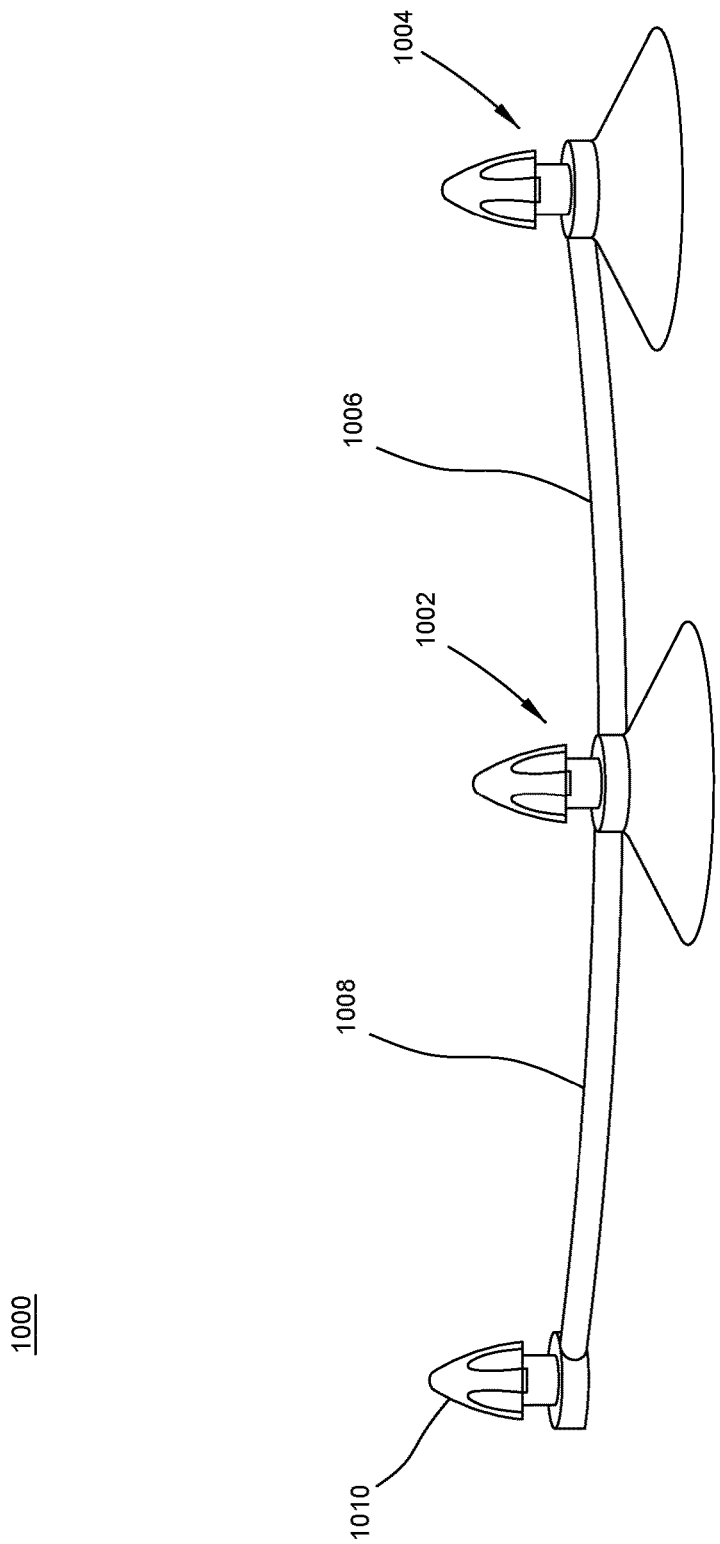
FIG. 10 shows an embodiment of a suction cup article having two suction cup units, in accordance with some embodiments.

FIG. 10 shows an embodiment of a suction cup article 1000 having two suction cup units 1002, 1004, in accordance with some embodiments. In some embodiments a suction cup article can have two suction cup units 1002, 1004 that are each substantially equivalent to suction cup units 102, 104, 106, and are joined by an arm 1006. In still some other embodiments, in addition to the two suction cup units 1002, 1004, and additional head 1010 at the distal end of an additional arm 1008 can be provided. The arrangement shown here shows the heads of the suction cup units 1002, 1004 and the additional head 1010 in generally linear arrangement, but they can be arranged in other shapes/patterns as well, including, for example, in a triangular arrangement.

Figure 11:
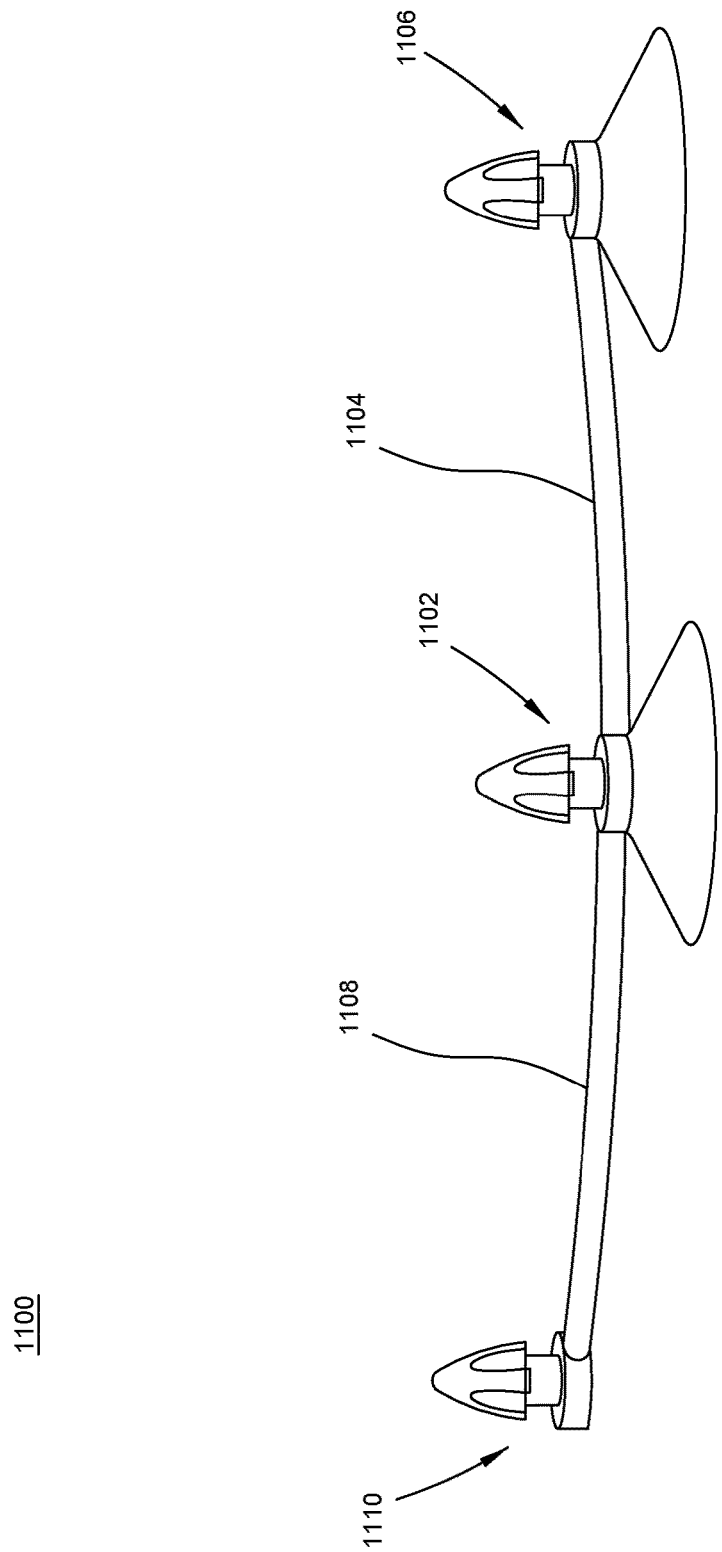
FIG. 11 shows an embodiment of a suction cup article having a single suction cup unit and two arms, in accordance with some embodiments.

FIG. 11 shows an embodiment of a suction cup article 1100 having a single suction cup unit 1102 and two arms 1104, 1108, in accordance with some embodiments. The suction cup unit 1102 can be the same as the suction cup units shown, for example, in FIGS. 1-2. The suction cup unit 1102 can have two arms 1104, 1108 extending from the base of the suction cup unit in different directions. As shown here the arms 1104, 1108 extend in substantially opposite directions, but they can extend in other arrangements/patterns as well. Further, in addition to the two arms 1104, 1108, there can be a head sub-unit 1106, 1110 at the distal end of each arm 1104, 1108. Each head sub-unit 1106, 1110 includes a conically shaped head with fins and channels, a neck, and a base. As shown, the suction cup unit 1100 can be used to hold up a vertical portion of a urinal screen, or an entire urinal screen in a vertical orientation, in a urinal.

A suction cup article has been disclosed that is useful for holding a vertically oriented urinal screen or the vertical portion of a urinal screen in a vertical position on a vertical surface of a urinal. more generally, the suction cup article is useful for holding any screen or similar basin article having one or more openings through which the head of a suction cup unit can pass to retain the suction cup unit to the article. The suction cup article is configured to prevent it from passing through a drain at the bottom of to the basin in the event that the suction cup article becomes dislodged from the urinal screen or other basin article. This can prevent costly plumbing repairs associated with prior art suction cups which can get lodged in the plumbing and create a backup condition where water doesn't drain from the basin fast enough after a flush and can overflow the basin. The disclosed suction cup articles also minimize the effect on the anti-splash features of the urinal screen by not deflecting the protrusions that provide the anti-splash functionality.

What is claimed is:

1. A suction cup article for attaching a urinal screen to a urinal surface, comprising:
    at least one suction cup unit including a suction cup, a head, and a neck disposed between the head and the suction cup, wherein the head is generally conic having a point that is directed away from the suction cup, and wherein the head has a plurality of channels that extend from a base of the head adjacent the neck toward the point thereby defining an equal number of fins between the channels; and
    at least one arm connected to and extending from a position between the neck and the suction cup of the at least one suction cup unit in a direction generally perpendicular to an axis defined from the point of the head through the neck and suction cup.

2. The suction cup article of claim 1, wherein the suction cup article comprises three suction cup units, wherein a first suction cup unit is joined by the at least one arm to a second suction cup unit at a position between a neck and a suction cup of the second suction cup unit, and the third suction cup unit is joined to the second suction cup unit by a second arm which extends from a position between the neck and the suction cup of the second suction cup unit to a position at the third suction cup unit between a neck and a suction cup of the third suction cup unit, and wherein the three suction cup units are each identical and arranged in a "V" formation.

3. The suction cup article of claim 1, wherein the entire suction cup unit is a unitary molded polymer.

4. The suction cup article of claim 1, wherein the plurality of channels are positioned to each correspond with a position of a respective protrusion of the urinal screen disposed around an opening through the urinal screen.

5. The suction cup article of claim 1, wherein the fins are configured to be deflected and return to their natural position.

6. The suction cup article of claim 1, wherein the arm comprises a head subunit disposed at a distal end of the arm.

7. A suction cup article, comprising:
    a suction cup unit having:
        a suction cup;
        a head;
        a neck disposed between the head and the suction cup;
        a base disposed between the neck and the suction cup;
        an arm connected to and extending from the base; and
    wherein the head is generally conic having a point that is directed away from the suction cup, and wherein the head has a plurality of channels that extend from a base of the head adjacent the neck toward the point thereby defining an equal number of fins between the channels, and wherein the fins are made of a resilient material such that the fins deflect into an adjacent channel when the head is inserted through an opening having a diameter smaller than the base of the head.

8. The suction cup article of claim 7, further comprising a head subunit disposed at a distal end of the arm, the head subunit comprising:
    a head having a conic shape and having a point;
    a neck at a base of the head; and
    a plurality of channels that extend from the base of the head adjacent the neck toward the point thereby defining an equal number of fins between the channels.

9. The suction cup article of claim 7, wherein the suction cup unit is a first suction cup unit, the suction cup article further comprising a second suction cup unit at an opposite end of the arm.

10. The suction cup article of claim 9, wherein the arm is a first arm, the suction cup article further comprising a second arm extending from the second suction cup unit to a third suction cup unit.

11. The suction cup article of claim 10, wherein the first, second, and third suction cup units are arranged in a "V" shape.

12. A suction cup article, comprising:
    a suction cup unit, having:
        a base;
        a suction cup extending from the base;
        a neck extending from the base opposite from the suction cup;
        an arm connected to and extending from the base;
        a conic head extending from the neck opposite from the base, the conic head having a base adjacent the neck that extends outward beyond the neck, the conic head having a point opposite from the base of the suction cup unit, the conic head having a plurality of channels that extend from the base of the conic head toward the point, and wherein the plurality of channels define a plurality of fins, each fin of the plurality of fins between two channels of the plurality of channels, and wherein each of the fins of the plurality of fins are configured to deflect to a side when the conic head is passed through an opening.

13. The suction cup article of claim 12, further comprising a head subunit disposed at a distal end of the arm.

14. The suction cup article of claim 12, wherein the suction cup unit is a first suction cup unit, the suction cup article further comprises a second suction cup unit at an opposite end of the arm.

15. The suction cup article of claim 14, where the arm is a first arm, the suction cup article further comprising a second arm extending from the second suction cup unit.

* * * * *